Sept. 18, 1934.  A. P. ARMINGTON ET AL  1,974,229
DUMP WAGON
Filed Aug. 16, 1932   2 Sheets-Sheet 1
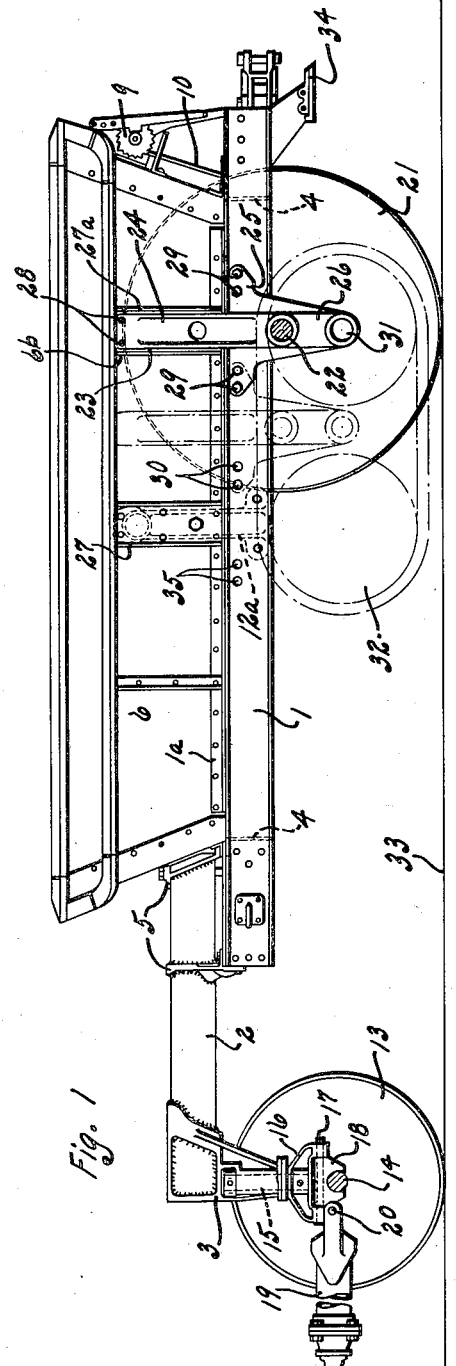
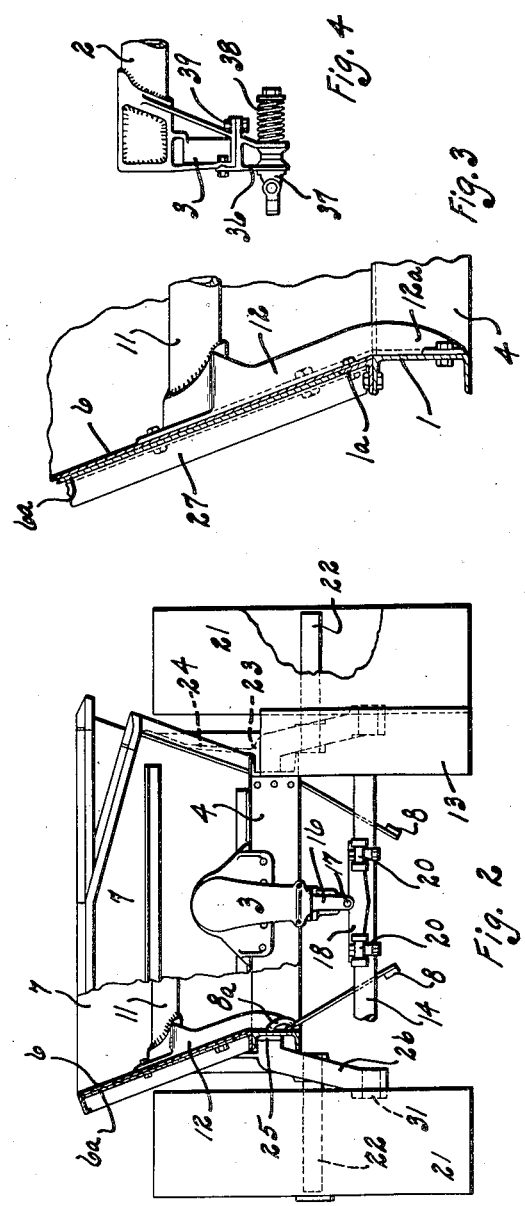
INVENTORS
Arthur P. Armington
George E. Armington
BY
Brockett, Hyde, Higley & Meyer
ATTORNEYS Sept. 18, 1934. A. P. ARMINGTON ET AL 1,974,229
DUMP WAGON
Filed Aug. 16, 1932    2 Sheets-Sheet 2

INVENTORS
Arthur P. Armington
George E. Armington
BY
Brockett, Hyde, Higley & Meyer
ATTORNEYS Patented Sept. 18, 1934

1,974,229

UNITED STATES PATENT OFFICE 1,974,229

DUMP WAGON

Arthur P. Armington, Willoughby, and George E. Armington, Cleveland, Ohio

Application August 16, 1932, Serial No. 629,032

4 Claims. (Cl. 298—35)

This invention relates to heavy-duty bottom-dumping vehicles adapted for earth-moving and the like and employed as trailers behind tractors.

Experience with the operation of such apparatus has developed in the past two more or less distinct vehicle types, one a direct hitch or cart type wherein the load is usually disposed substantially balanced on a single pair of wheel means, and the other a wagon type where two pairs of wheel means are employed.

An object of the invention is to provide a vehicle capable of service as either type and easily convertible from one type to the other.

In both types of vehicle the best dumping arrangement is a single pair of bottom dumping doors hinged along the body sides to dump by swinging downwardly and outwardly, since by such arrangement the doors serve to clear the wheel means of the dumped load, and allow the vehicle to easily advance from the dumped load. Obviously, where bottom dumping doors are employed the load-carrying body must be elevated sufficiently to clear the doors from the ground when in dumping position.

As to the wheel means, round wheels have been employed, of diameter and tread width dependent upon their loading. Various wheel substitutes have also been employed, particularly such as of the well-known truss-forming crawler type wherein an endless tread linkage is arranged to serve as a self-laying track. While such wheel substitutes are superior to round wheels in load-carrying capacity, they are more costly and of shorter life, and hence round wheels are preferable where ground conditions will permit their use. Also, round wheels being of larger diameter than the corresponding dimensions of the crawler units, the mounting of the wheel means varies with the nature thereof. A further object of this invention is to provide a vehicle adapted for use interchangeably with either type of wheel means.

The demand is constantly for a greater capacity in such a vehicle, and this invention contemplates one of very large capacity. In such large sizes, however, the distribution of the load upon the wheel means employed becomes a matter of increasing importance. Particularly in the wagon type, where round wheels are used as the forward supporting means, if these wheels carry too much of the load they will mire in soft going and if they carry too little of the load they will side-slip in downhill going and allow the wagon to jackknife upon its tractor. What load is not carried by the front wheels must be carried by the rear wheel means, and what the rear wheel means can carry depends upon the capacity of the latter.

It is another object of this invention to provide that the location of the wheel means may be fixed properly in accordance with the various conditions imposed thereon.

Obviously, in a car type vehicle, if a transverse axle be employed it will be located medial of the ends of the body, dividing the dumping opening into two equal parts. But in a wagon type of vehicle the rear wheel means must be considerably nearer the rear end of the body, so that if a transverse axle were employed it would divide the dumping opening into two parts, the rearward of which would be of such short length as to be practically useless in clearing large obstructions such as boulders, tree stumps, clumps of sticky clay, and the like. Also, both parts of the dumping opening would be of very inefficient shape.

Another object is to provide that the dumping opening shall be entirely unobstructed, independent of the location of the supporting wheel means.

The width of body of such a vehicle cannot be materially increased since elevation of the body must follow in order that the doors clear the ground. Also, the tread spacing is practically determined by that of the tractor which is to serve the vehicle which in turn is determined by other considerations. Too much depth of body would unduly elevate the center of gravity. Thus to increase the vehicle capacity only the length of its load-carrying body may be increased. The consequent proportions are a length approximately and usually at least twice its width. But with such proportions a transverse brace member medial of the length does not materially hinder dumping of the load since it leaves two square dumping clearances. This is a further object of the invention.

It is preferable for many reasons that the body sides extend outwardly as they extend upwardly from the frame, through which dumping is had. With such arrangement and in view of the vehicle's described necessary length of body, side brace means are necessary between the sides. Still a further object of the invention is to provide brace means in such a body medial of its length so as to have maximum effect upon the sides and elevated above the frame so as to have minimum obstruction to dumping.

It will be seen that the ultimate objects of the invention are to provide a vehicle which shall have universal application, that is adapted to ready conversion to proportioning and arrangement of its parts to exactly fit the immediate conditions of its operation; to allow both the manufacturer, the dealer, and the user to make up of a minimum number of stock parts a vehicle perfectly adapted to the instant requirement, and to permit the user to change his vehicle as his working conditions change and at a minimum expense.

The exact nature of this invention together with further objects and advantages thereof will be apparent from the following description taken in connection with the accompanying drawings, in which Fig. 1 is a side elevation of an embodiment of the invention, illustrating the parts employed as in a four-wheeled wagon with the doors closed, the near wheels being removed to better show details of construction, and the figure illustrating in dot-dash lines a manner of employing crawler units as round wheel substitutes; Fig. 2 is a front elevation of the same but as with draft tongue and right front wheel removed and doors partly open, parts being broken away to show details of construction; Fig. 3 is an enlarged detail of parts appearing in Fig. 2, illustrating the manner of rigidly associating the brace member which extends between the body sides, with the side frame members; Fig. 4 is a detail side elevation illustrating the means and manner of conversion of the vehicle into direct hitch or cart type; and Figs. 5-8 inclusive are comparative diagrammatic views in side elevation illustrating the different arrangements of parts which may be employed, Figs. 5 and 6 illustrating a wagon type of vehicle with round wheels and crawler treads respectively, and Figs. 7 and 8 illustrating a cart type of vehicle with round wheels and crawler treads respectively.

With reference now to the drawings and particularly to Figs. 1 and 2 thereof, the principal parts of the vehicle are a frame, a load-carrying body supported thereon, and wheel means supporting the frame and thereby the body.

The principal parts of the frame are a pair of side members 1 shown as of structural channels having their flanges turned outwardly, suitable transverse frame members extending between and connecting the side frame members 1, a central draft member 2 extending forwardly of the side frame members 1, and carrying at its forward end a downwardly extending tongue part 3. These frame parts are rigidly connected as by the brackets, bolts, welds, etc., as indicated, or any other convenient manner, to form a rigid unit, leaving an unobstructed rectangular horizontal opening between the side frame members 1 and transverse frame members therebetween as indicated at 4. The draft member 2 may be of hollow cylindrical form mounted above the rectangular frame part of which the members 1 are side members, as by brackets 5, and the tongue part 3 may fit over the end of the draft member 2 and be welded thereupon, as indicated.

The principal parts of the body are four walls including a pair of side walls 6 and end walls 7 mounted on the described rectangular part of the frame and there rigidly secured as by the angle irons to which both frame and walls are riveted to provide an open hopper, and a pair of doors 8 arranged to control dumping from said hopper. The hopper walls extend outwardly as they extend upwardly from the frame, and a rail is provided about the upper extremity of the hopper forming an upper or secondary frame. The opening defined by the frame is unobstructed by any transverse members, and is approximately of length twice its width; and consequently the hopper, whose walls rise from about this opening, has generally similar proportions. A single pair of doors 8 are arranged to control the opening in the frame, and consequently dumping through the bottom of the hopper. These doors are conveniently hinged to the side frame members 1 as by links 8a, each extending the full length of the dumping opening and each of width equal to half the width of the opening, so that when in horizontal position the opening is closed, and from which position the doors swing downwardly and laterally to vertical dumping position. The hopper being above the frame and the doors being at the lower extremity of the frame, the frame, to the extent of the height of the side frame members 1, serves to increase the load-carrying capacity of the body. A winding gear generally indicated at 9 is arranged at the rear of the hopper to control the doors 8 through suitable and usual cable means 10, and a step 34 is provided for the use of the operator of the winding gear.

A brace 11 elevated above the side frame members 1 and medial of the length of the body is secured by brackets 12 to the side walls 6 of the hopper. Thus collapse or bowing of the side walls is prevented yet without obstructing the dumping opening. The brackets 12 may have parts 12a extending downwardly from the brace 11, and bolted to the side frame members 1 as indicated, whereby the brace 11 and side frame members 1 are rigidly connected. On the outside of the body, opposite each bracket 12 is a plate 6a of thickness equal to that of the upstanding leg of the angle iron 1a. A channel iron 27 is placed over the plate 6a, extending downwardly over the angle iron 1a, and forwardly to the top rail of the body, with its flanges turned outwardly, all as shown; and the parts are riveted or bolted together as indicated. Thus the top rail of the body, the side frame members and the brace 11 are all rigidly interassociated.

The vehicle shown being of wagon type, it has two sets of wheel means. At its forward end are round wheels 13 of diameter small enough to clear the draft member 2 when the parts are level. The wheels are mounted on the ends of an axle 14 associated with the tongue part 3. The tongue part has a vertical round socket to receive a vertical pin 15 which carries at its lower end a swivel casting 16. The casting 16 and the tongue part 3 have cooperating bearing faces and the pin maintains these faces in abutting relation yet allows swiveling of the casting 16 about the axis of the pin. The casting 16 carries a horizontal pin 17 extending longitudinally of the vehicle. A bracket 18 secured upon the axle 14 is swingably mounted upon the pin 17. The parts are so proportioned and arranged that the axle 14 and the pin 15 are in the same vertical plane, and also that the wheels 13 moving about the axis of the pin 15, under the draft member 2, will clear the frame parts. A draw bar 19 is secured to the bracket 18 by an arrangement including horizontally transversely extending pins 20 whereby the draw bar may have motion relative to the bracket, only about the pins 20. The front end of the draw bar 19 may thus move up and down independent of the wheels but steering motion of the draw bar will be followed by the wheels, and the axle is free to tilt laterally to allow the wheels to accommodate themselves to laterally sloping ground.

The vehicle is provided with rearward supporting wheel means in the form of large round wheels 21 at the sides of the body. These wheels 21 have wide treads and necessarily wider spacing than do the front wheels. Each is carried on a stub shaft 22 outwardly extending from an opening in a bracket 23. Each bracket 23 has an upper part 24 adapted to bear against the side wall 6 of the body, an intermediate part 25 secured to the near side frame member 1, and a lower part 26 carrying the stub shaft 22. Preferably the body side wall is provided with a stiffening member 27a and plate 6b underlying the bracket part 24 similar to the arrangement at 27, and the bracket may be bolted to the body side wall as at 28 by means passing through the stiffener 27a. The bracket is secured to its side frame member 1 by bolts 29, a pair on each side of the central plane of the bracket. The locations of the stub shafts 22 below the frame are such that the body parts will be horizontal, as illustrated. The brackets being on the outside of the frame and body, the dumping opening is unobstructed and the doors extend uninterrupted through the zone of the rear wheels.

The arrangement is such that the brace 11 and brackets 23 become effectively part of the frame means by which the wheels 21 are connected in place of the usual straight through axle. Thus from one of the stub shafts 22 spreading stresses are transmitted through the near bracket 23, largely forwardly along the near side frame member 1, upwardly through the corresponding stiffener 27 and bracket 12, across through the brace 11, and thence to the other stub shaft 22 in similar manner.

The illustrated location of the brackets 23 is such that approximately three-quarters of the load will be carried upon the rear wheels 21 and one-quarter upon the front wheels 13; and this we have found to be substantially the correct loading with the round wheels illustrated.

Should it be desired to substitute crawler units as the rear supporting wheel means, since crawler units have superior supporting characteristics it is desirable that they carry a greater proportion of the load. Consequently, we provide that the brackets 23 may be adjusted forwardly to the dot-dash position illustrated in Fig. 1. To this end, bolt holes 30 are provided so spaced from the bolt holes 29 that when the forward ends of the brackets are secured by using the bolts 30, the rearward ends of the brackets will fit the forward bolt holes 29. When the brackets are here positioned, an extra pair of stiffeners, such as the stiffeners 27, are preferably employed.

Since the crawler units are lower than the round wheels, and in order that the brackets 23 may be retained when the crawlers are used, the lower parts 26 of the brackets are extending downwardly below the stub shafts 22 and provided with openings 31 to receive stub shafts for the crawlers. The elevation of the openings 31 is such that when the crawlers are employed, as indicated in broken lines at 32, the bottom of the crawlers will be slightly higher than the bottom of the round wheels 21. This is because, in practice, the round wheels will sink into the ground-line 33 more than the crawlers will.

Thus the crawlers may be substituted for round wheels by merely shifting the brackets 23 forwardly and replacing the stub shafts 22 in the upper holes of the brackets, by shorter stub shafts secured in the lower holes 31 of the brackets; and when such change is made, the proper distribution of weight will still be had between the forward and rearward wheel means.

The vehicle is also adapted for use as a cart, where no front wheels are employed so that all of the load is carried upon a single pair of wheel means. Therefore openings 35 are provided in the side frame members 1 that the brackets 23 may be shifted to a position central of the body, in the zone of the brace 11, the brackets being secured by bolts passing through the openings 35 and 30.

The forward wheels 13 being no longer necessary, the pin 15 is withdrawn from the tongue part 3 of the drawbar, and the bracket 16 and associated parts removed. As shown in Fig. 4, a hitch casting 36 carrying a draft plunger 37 for direct hitch to the tractor and backed by a spring 38, is secured to the tongue part 3 as by bolts 39. The proportions of the parts are such that the vehicle body parts will be substantially level when the hitch is made by the draft plunger 37 directly to the tractor draw bar, so that the load will be substantially balanced upon the wheel means. The wheel means may be either the large round wheels, or crawler units.

Figs. 5-8 of the drawings illustrate the vehicle forms which will be most usually desirable. Fig. 5 shows the wagon type wherein the rear wheel means comprise round wheels, located in the most rearward position wherein they carry substantially three-quarters of the load.

Figure 5:
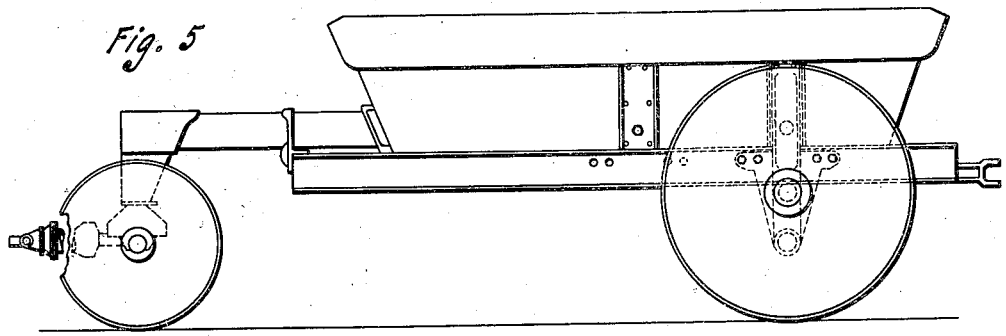
Figure 6:
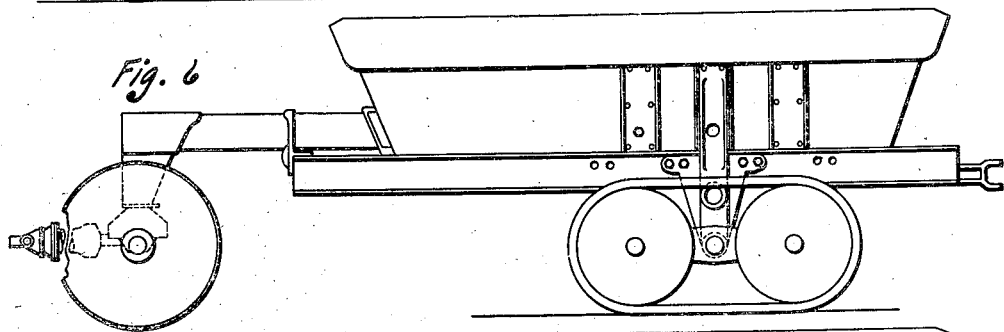
Fig. 6 shows a wagon type wherein crawler units are employed as the rear wheel means and located to carry about seven-eighths of the load.
Figure 7:
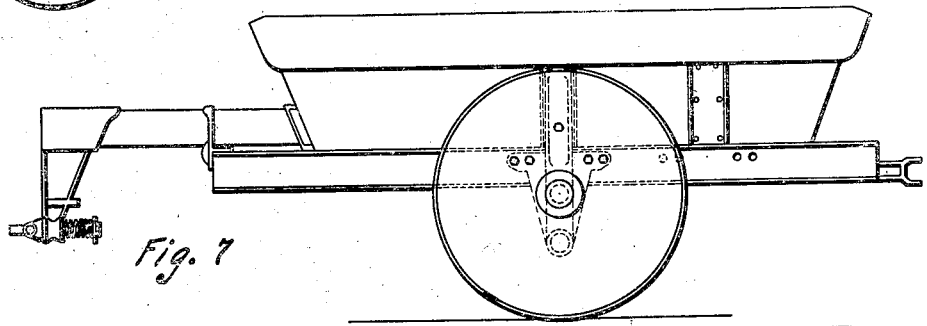
Fig. 7 shows a cart type with round wheel centrally located. This arrangement is superior to all others whenever ground conditions will permit, since round wheels are cheaper than crawlers, require less draft and have longer life.
Figure 8:
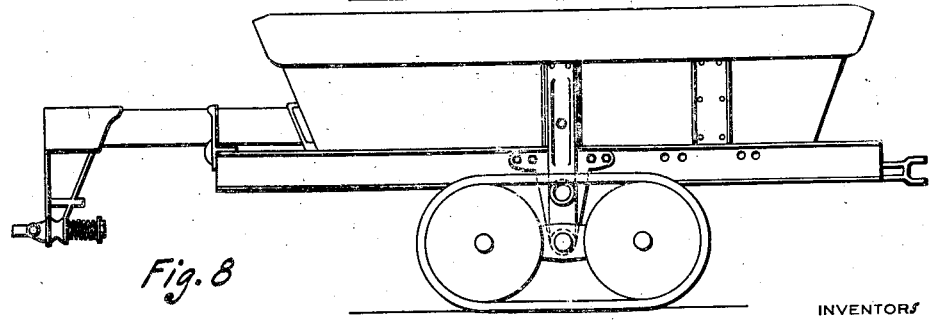
Fig. 8 illustrates a cart type, with the crawler units which will be frequently found necessary to carry all of the load.

What we claim is:

1. In a heavy duty vehicle of the class described, a frame defining an unobstructed opening of length greater than its width, body walls arranged extending upwardly from the frame to provide an open hopper, laterally swinging doors arranged to control dumping from said hopper through said opening, brace means between the side members of said hopper medial of the ends thereof, bracket means secured with the side frame members rearward of said brace and forward of the rear wall of said hopper, said bracket means extending below said frame and there having associated wheel means, and means for supporting the forward end of said frame, whereby loading and dumping will be equally forwardly and rearwardly of said brace means, and said wheel means will carry less than the entire hopper load.

2. In a heavy duty vehicle of the class described, a frame defining an unobstructed opening of length substantially twice its width, body walls arranged extending upwardly from the frame to provide an open hopper, laterally swinging doors arranged to control dumping from said hopper through said opening, brace means arranged medially between the side members of said hopper, to define two substantially square clearances for the load, bracket means secured with the side frame members rearward of said brace and forward of the rear wall of said hopper, said bracket means extending below said frame and there having associated wheel means, and means for supporting the forward end of said frame.

3. In a heavy duty vehicle of the class described, a frame defining an unobstructed opening of length greater than its width, body walls arranged extending upwardly from the frame to provide an open hopper having sloping side walls, laterally swinging doors arranged to control dumping from said hopper through said opening, a brace between said body side walls intermediate the ends thereof and elevated above said frame, bracket means arranged rearward of said brace and forward of the rear wall of said hopper and secured with the side frame members, said bracket means extending below said frame and there having associated wheel means, and means for supporting the forward end of said frame.

4. In a heavy duty vehicle of the class described, a frame defining an unobstructed opening of length greater than its width, body walls arranged extending upwardly from the frame to provide an open hopper having sloping side walls, laterally swinging doors arranged to control dumping from said hopper through said opening, a brace between said body side walls medial of the ends thereof and elevated above said frame, bracket means arranged on the frame rearward of said brace and forward of the rear wall of said hopper, said bracket means extending from their side frame members upwardly outside said hopper and being attached thereto and extending downwardly of said frame and therebelow having associated wheel means, and means for supporting the forward end of said frame.

ARTHUR P. ARMINGTON.
GEORGE E. ARMINGTON.